United States Patent
Akihisa et al.

(10) Patent No.: US 8,109,243 B2
(45) Date of Patent: Feb. 7, 2012

(54) SPARK IGNITION TYPE INTERNAL COMBUSTION ENGINE

(75) Inventors: Daisuke Akihisa, Susono (JP); Eiichi Kamiyama, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 180 days.

(21) Appl. No.: 12/227,238

(22) PCT Filed: Apr. 9, 2007

(86) PCT No.: PCT/JP2007/058218

§ 371 (c)(1),
(2), (4) Date: Nov. 12, 2008

(87) PCT Pub. No.: WO2007/145020

PCT Pub. Date: Dec. 21, 2007

(65) Prior Publication Data

US 2010/0163001 A1    Jul. 1, 2010

(30) Foreign Application Priority Data

Jun. 15, 2006 (JP) .................. 2006-165967

(51) Int. Cl.
*F02B 75/04* (2006.01)

(52) U.S. Cl. ........................... 123/48 C

(58) Field of Classification Search ............ 123/179.17, 123/179.3, 179.4, 334.24, 179.16, 179.15, 123/179.14, 90.11, 90.15–90.18, 316; 701/110, 701/112, 22, 102, 103, 113; 335/256, 220; F02B 75/04

See application file for complete search history.

(56) References Cited

U.S. PATENT DOCUMENTS

| 7,059,280 | B2 * | 6/2006 | Nohara et al. ............... 123/48 D |
| 7,167,789 | B1 * | 1/2007 | Froloff et al. ................. 701/101 |
| 2005/0103290 | A1 | 5/2005 | Magner et al. |

FOREIGN PATENT DOCUMENTS

| EP | 1 701 021 A1 | 9/2006 |
| JP | A-2001-263099 | 9/2001 |
| JP | A-2002-285876 | 10/2002 |
| JP | A-2003-232233 | 8/2003 |
| JP | A-2003-314315 | 11/2003 |
| JP | A-2005-220754 | 8/2005 |
| JP | A-2006-52698 | 2/2006 |
| JP | A-2006-144714 | 6/2006 |

* cited by examiner

*Primary Examiner* — Michael Cuff
*Assistant Examiner* — Keith Coleman
(74) *Attorney, Agent, or Firm* — Oliff & Berridge, PLC

(57) ABSTRACT

An internal combustion engine provided with a variable compression ratio mechanism able to change a mechanical compression ratio and a variable valve timing mechanism able to individually control the opening timing and closing timing of the intake valve. At the time of engine low load operation, the maximum expansion ratio is obtained by making the mechanical compression ratio maximum and, while the mechanical compression ratio is made maximum, the opening timing of the intake valve is maintained at a target opening timing of substantially intake top dead center in the noninterference region where no interference between the valve and the piston occurs.

20 Claims, 14 Drawing Sheets (A)   (B)

FIG.5
(A)
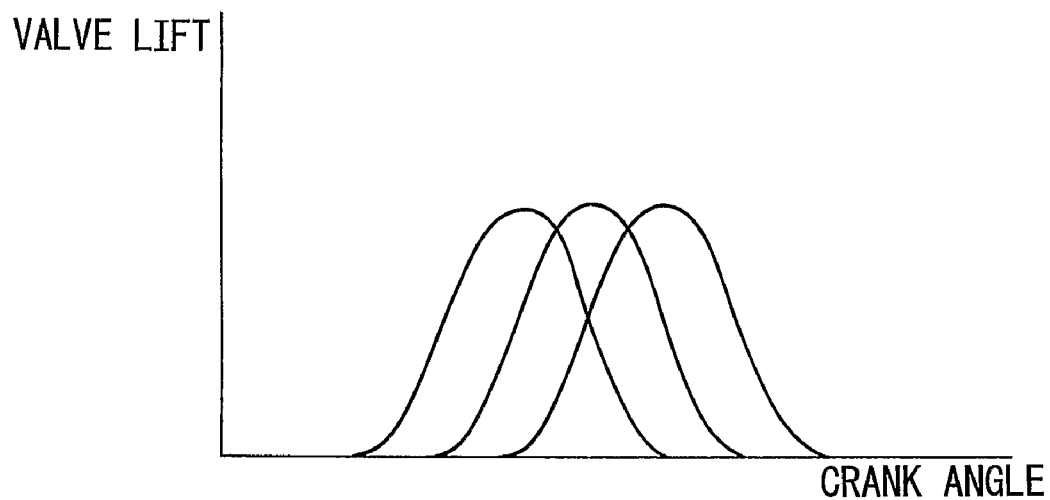
(B)
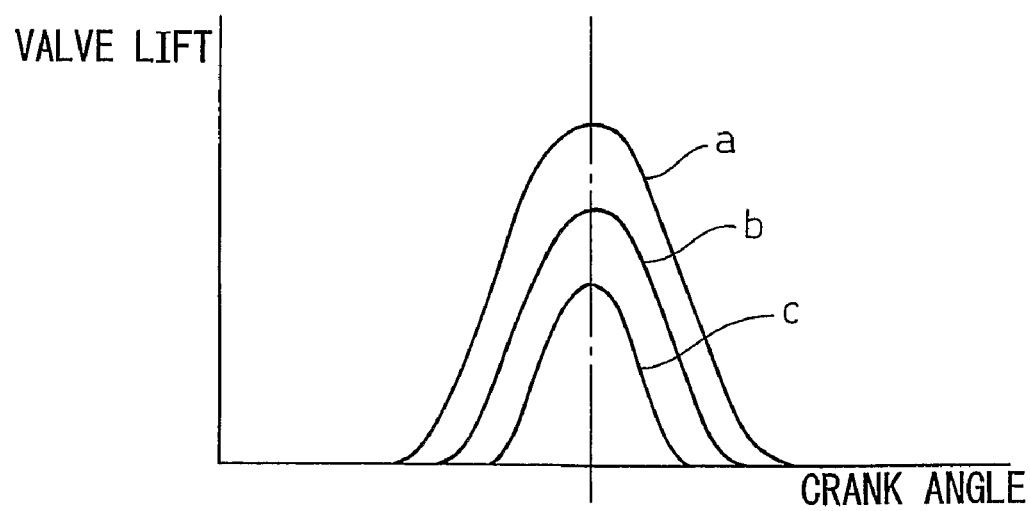

FIG.6
(A)
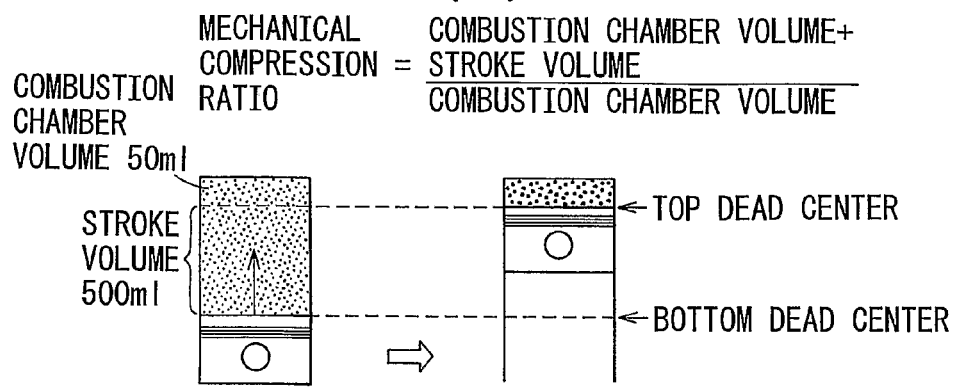
(B)
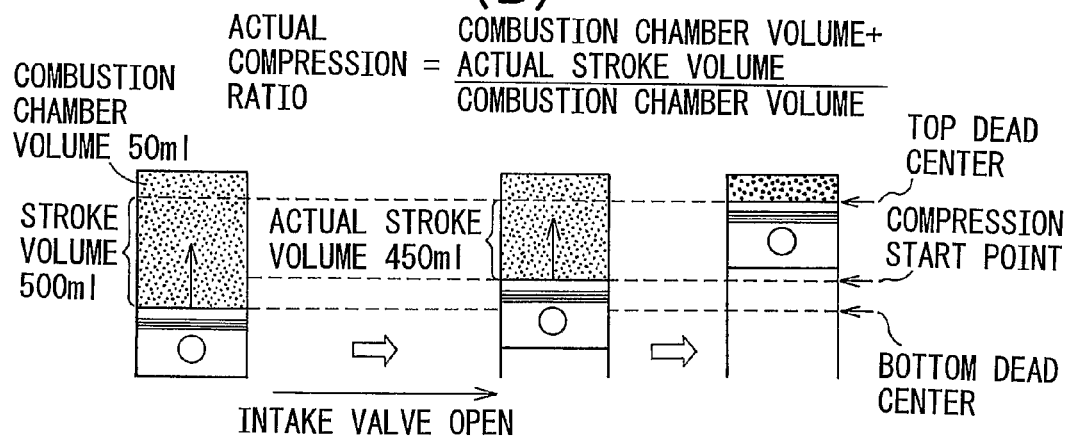
(C)
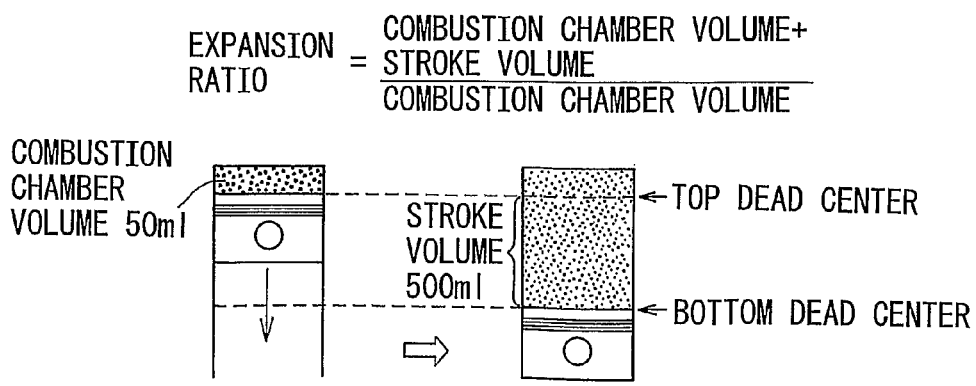

FIG.10
(A)
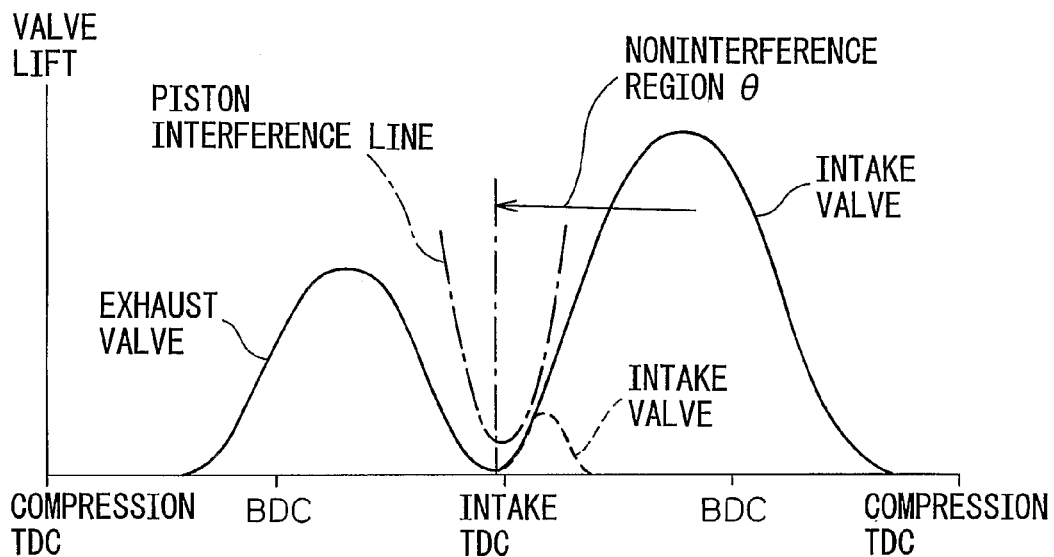
(B)
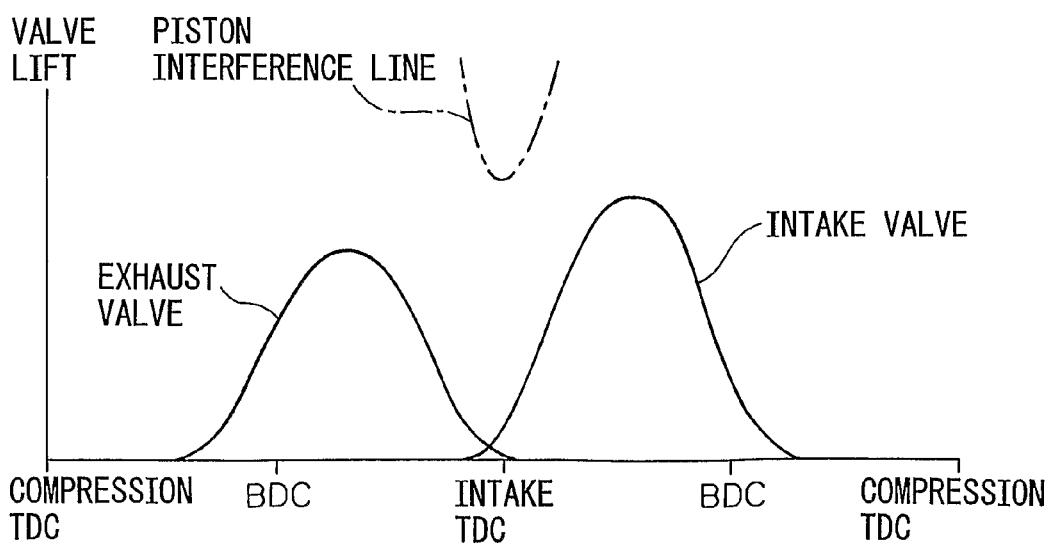

FIG.14
(A)
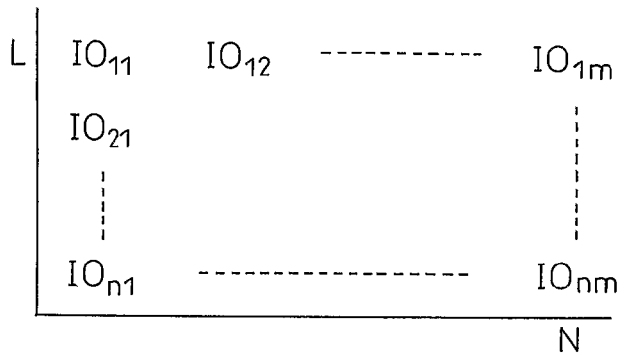
(B)
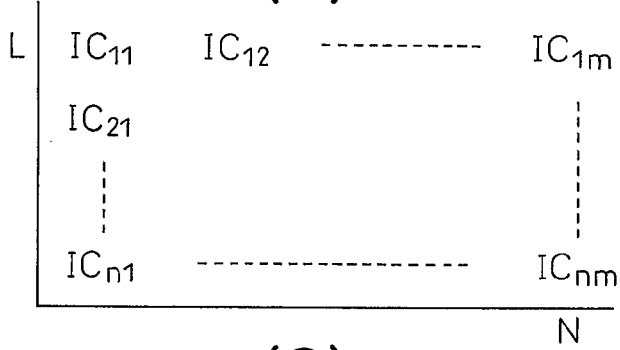
(C)
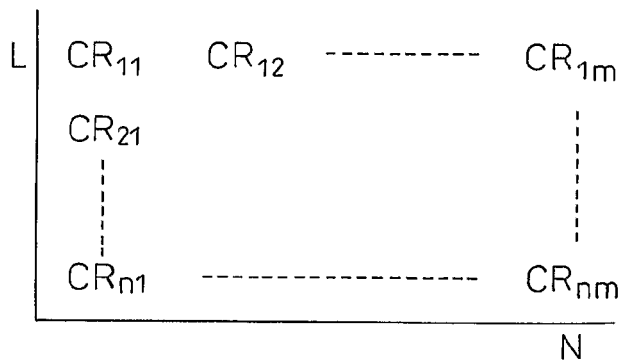
(D)
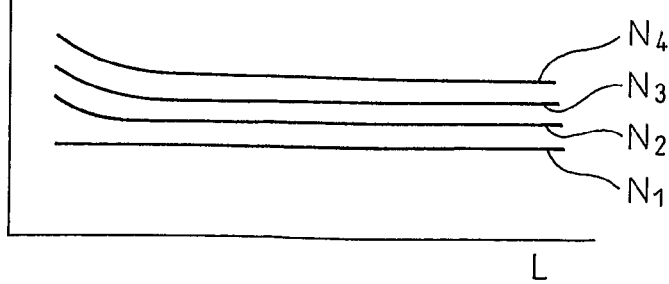

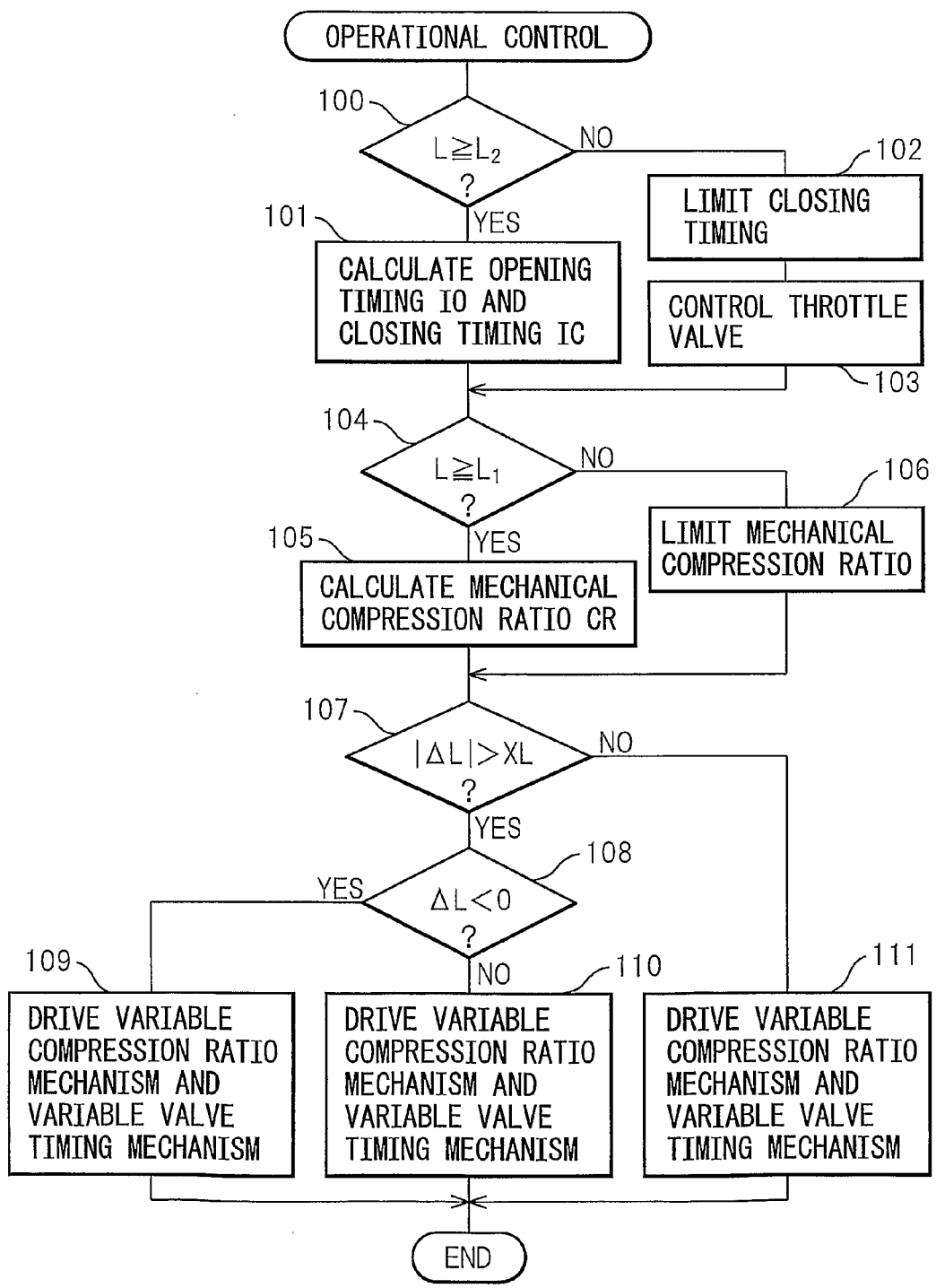

SPARK IGNITION TYPE INTERNAL COMBUSTION ENGINE

TECHNICAL FIELD

The present invention relates to a spark ignition type internal combustion engine.

BACKGROUND ART

Known in the art is a spark ignition type internal combustion engine provided with a variable compression ratio mechanism able to change a mechanical compression ratio and a variable valve timing mechanism able to individually control the opening timing and closing timing of the intake valve and shifting the closing timing of the intake valve in a direction away from intake bottom dead center and raising the mechanical compression ratio the lower the engine load (for example, see Japanese Patent Publication (A) No. 2002-285876). In this internal combustion engine, at the time of idling operation, the intake valve is made to open after intake top dead center has been considerably past and is made to close after a short opening time.

Further, generally speaking, in an internal combustion engine, the lower the engine load, the worse the thermal efficiency, therefore to improve the thermal efficiency at the time of vehicle operation, that is, to improve the fuel consumption, it becomes necessary to improve the thermal efficiency at the time of engine low load operation. However, in an internal combustion engine, the larger the expansion ratio, the longer the period during which a force acts pressing down the piston at the time of the expansion stroke, therefore the larger the expansion ratio, the more the thermal efficiency is improved. On the other hand, if raising the engine compression ratio, the expansion ratio becomes higher. Therefore to improve the thermal efficiency at the time of vehicle operation, it is preferable to raise the mechanical compression ratio at the time of engine low load operation as much as possible to enable the maximum expansion ratio to be obtained at the time of engine low load operation.

However, if raising the engine compression ratio, the combustion chamber volume at intake top dead center becomes smaller. Accordingly, there is the problem that if opening the intake valve too much in advance of intake top dead center, the intake valve will end up interfering with the top of the piston. Therefore, when raising the mechanical compression ratio, it is necessary to prevent this problem from arising by making the intake valve open in a noninterference region where the piston is not interfered with. In this case, when opening the intake valve after intake top dead center, ordinarily the intake valve will not interfere with the piston. The intake valve interferes with the piston when the intake valve is opened before intake top dead center. Therefore, to prevent the intake valve from interfering with the piston, the intake valve must be made to open in the noninterference region before intake top dead center or must be made to open after intake top dead center.

However, in this case, if making the intake valve open after intake top dead center, the inside of the combustion chamber becomes a vacuum pressure until the intake valve opens and accordingly pumping loss occurs. Therefore, like in the above known internal combustion engine, at the time of idling operation, considerable pumping loss occurs when making the intake valve open considerably after intake top dead center.

Now, as explained above, to improve the thermal efficiency at the time of vehicle operation, it is preferable to obtain the maximum expansion ratio at the time of engine low load operation by making the mechanical compression ratio as high as possible. However, at this time, pumping loss occurs and the thermal efficiency ends up falling, so the meaning of raising the mechanical compression ratio ends up being halved.

DISCLOSURE OF THE INVENTION

An object of the present invention is to provide a spark ignition type internal combustion able to prevent interference by the intake valve with the piston, prevent the occurrence of pumping loss, and obtain a high thermal efficiency when raising the engine thermal efficiency by raising the mechanical compression ratio.

According to the present invention, there is provided a spark ignition type internal combustion engine comprising a variable compression ratio mechanism able to change a mechanical compression ratio and a variable valve timing mechanism able to individually control the opening timing and closing timing of the intake valve, an amount of suction air in accordance with the required load is fed into a combustion chamber by shifting the closing timing of the intake valve in a direction away from intake bottom dead center the lower the engine load, the mechanical compression ratio is made maximum so that the maximum expansion ratio is obtained at the time of engine low load operation, and the opening timing of the intake valve is maintained at a target opening timing of substantially intake top dead center in a noninterference region where a piston is not interfered with at least during the time in which the mechanical compression ratio is made maximum.

BRIEF DESCRIPTION OF THE DRAWINGS

FIG. 5 is a view showing the amounts of lift of the intake valve and exhaust valve.

FIG. 6 is a view for explaining the engine compression ratio, actual compression ratio, and expansion ratio.

FIG. 10 is a view showing the amounts of lift of a intake valve and exhaust valve.

FIG. 14 is a view of a map of the opening timing IO of the intake valve.

FIG. 15 is a flowchart for operational control.

BEST MODE FOR CARRYING OUT THE INVENTION

Figure 1:
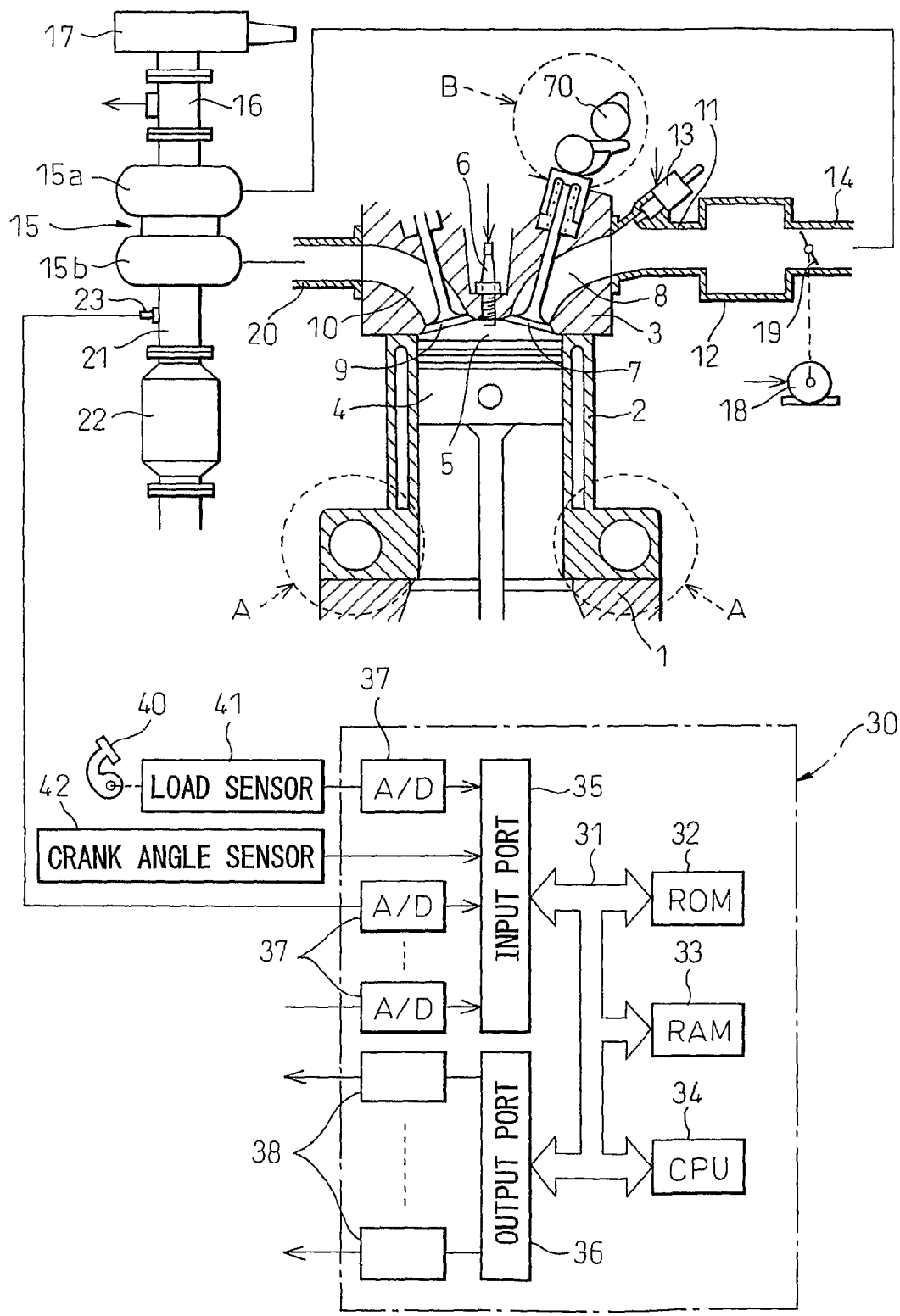
FIG. 1 is an overview of a spark ignition type internal combustion engine.

FIG. 1 shows a side cross-sectional view of a spark ignition type internal combustion engine.

Referring to FIG. 1, 1 indicates a crank case, 2 a cylinder block, 3 a cylinder head, 4 a piston, 5 a combustion chamber, 6 a spark plug arranged at the top center of the combustion chamber 5, 7 an intake valve, 8 an intake port, 9 an exhaust valve, and 10 an exhaust port. The intake port 8 is connected through an intake branch tube 11 to a surge tank 12, while each intake branch tube 11 is provided with a fuel injector 13 for injecting fuel toward a corresponding intake port 8. Note that each fuel injector 13 may be arranged at each combustion chamber 5 instead of being attached to each intake branch tube 11.

The surge tank 12 is connected via an intake duct 14 to an outlet of the compressor 15a of the exhaust turbocharger 15, while an inlet of the compressor 15a is connected through an intake air amount detector 16 using for example a hot wire to an air cleaner. The intake duct 14 is provided inside it with a throttle valve 19 driven by an actuator 18.

On the other hand, an exhaust port 10 is connected through the exhaust manifold 20 to the inlet of the exhaust turbine 15b of the exhaust turbocharger 15, while an outlet of the exhaust turbine 15b is connected through an exhaust pipe 21 to for example a catalytic converter 22 housing a three-way catalyst. The exhaust pipe 21 has an air-fuel ratio sensor 23 arranged in it.

On the other hand, in the embodiment shown in FIG. 1, the connecting part of the crank case 1 and the cylinder block 2 is provided with a variable compression ratio mechanism A able to change the relative positions of the crank case 1 and cylinder block 2 in the cylinder axial direction so as to change the volume of the combustion chamber 5 when the piston 4 is positioned at compression top dead center, and there is further provided with a variable valve timing mechanism B able to individually control the closing timing of the intake valve 7 and the opening timing of the intake valve 7 so as to change the start timing of the actual compression action.

The electronic control unit 30 is comprised of a digital computer provided with components connected with each other through a bidirectional bus 31 such as a ROM (read only memory) 32, RAM (random access memory) 33, CPU (microprocessor) 34, input port 35, and output port 36. The output signal of the intake air amount detector 16 and the output signal of the air-fuel ratio sensor 23 are input through corresponding AD converters 37 to the input port 35. Further, the accelerator pedal 40 is connected to a load sensor 41 generating an output voltage proportional to the amount of depression L of the accelerator pedal 40. The output voltage of the load sensor 41 is input through a corresponding AD converter 37 to the input port 35. Further, the input port 35 is connected to a crank angle sensor 42 generating an output pulse every time the crankshaft rotates by for example 30°. On the other hand, the output port 36 is connected through the drive circuit 38 to a spark plug 6, fuel injector 13, throttle valve drive actuator 18, variable compression ratio mechanism A, and variable valve timing mechanism B.

Figure 2:
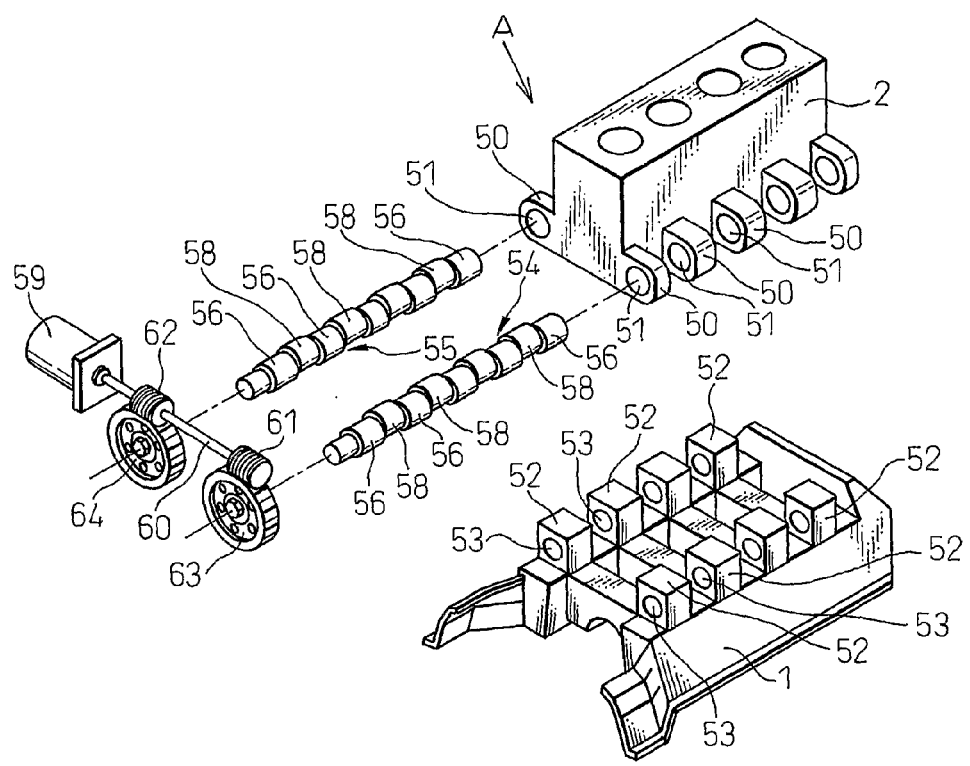
FIG. 2 is a disassembled perspective view of a variable compression ratio mechanism.
Figure 3:
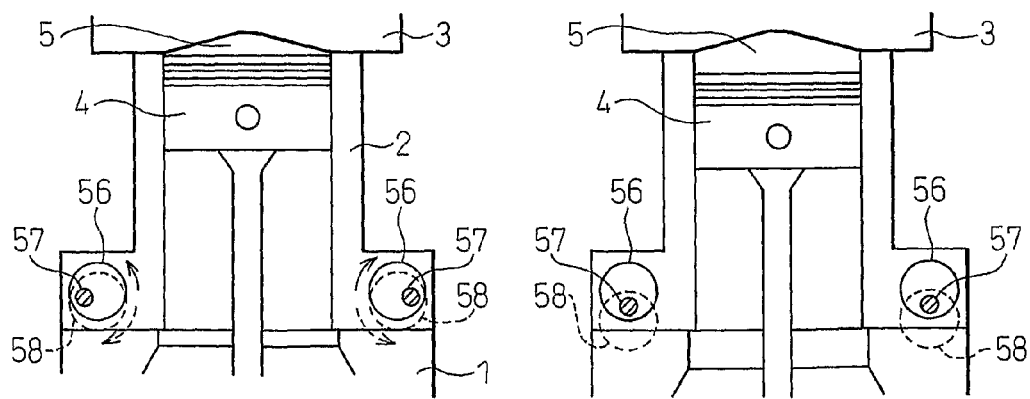
FIG. 3 is a side cross-sectional view of the illustrated internal combustion engine.

FIG. 2 is a disassembled perspective view of the variable compression ratio mechanism A shown in FIG. 1, while FIG. 3 is a side cross-sectional view of the illustrated internal combustion engine. Referring to FIG. 2, at the bottom of the two side walls of the cylinder block 2, a plurality of projecting parts 50 separated from each other by a certain distance are formed. Each projecting part 50 is formed with a circular cross-section cam insertion hole 51. On the other hand, the top surface of the crank case 1 is formed with a plurality of projecting parts 52 separated from each other by a certain distance and fitting between the corresponding projecting parts 50. These projecting parts 52 are also formed with circular cross-section cam insertion holes 53.

As shown in FIG. 2, a pair of cam shafts 54, 55 is provided. Each of the cam shafts 54, 55 has circular cams 56 fixed on it able to be rotatably inserted in the cam insertion holes 51 at every other position. These circular cams 56 are coaxial with the axes of rotation of the cam shafts 54, 55. On the other hand, between the circular cams 56, as shown by the hatching in FIG. 3, extend eccentric shafts 57 arranged eccentrically with respect to the axes of rotation of the cam shafts 54, 55. Each eccentric shaft 57 has other circular cams 58 rotatably attached to it eccentrically. As shown in FIG. 2, these circular cams 58 are arranged between the circular cams 56. These circular cams 58 are rotatably inserted in the corresponding cam insertion holes 53.

When the circular cams 56 fastened to the cam shafts 54, 55 are rotated in opposite directions as shown by the solid line arrows in FIG. 3(A) from the state shown in FIG. 3(A), the eccentric shafts 57 move toward the bottom center, so the circular cams 58 rotate in the opposite directions from the circular cams 56 in the cam insertion holes 53 as shown by the broken line arrows in FIG. 3(A). As shown in FIG. 3(B), when the eccentric shafts 57 move toward the bottom center, the centers of the circular cams 58 move to below the eccentric shafts 57.

As will be understood from a comparison of FIG. 3(A) and FIG. 3(B), the relative positions of the crank case 1 and cylinder block 2 are determined by the distance between the centers of the circular cams 56 and the centers of the circular cams 58. The larger the distance between the centers of the circular cams 56 and the centers of the circular cams 58, the further the cylinder block 2 from the crank case 1. If the cylinder block 2 moves away from the crank case 1, the volume of the combustion chamber 5 when the piston 4 is positioned as compression top dead center increases, therefore by making the cam shafts 54, 55 rotate, the volume of the combustion chamber 5 when the piston 4 is positioned as compression top dead center can be changed.

As shown in FIG. 2, to make the cam shafts 54, 55 rotate in opposite directions, the shaft of a drive motor 59 is provided with a pair of worm gears 61, 62 with opposite thread directions. Gears 63, 64 engaging with these worm gears 61, 62 are fastened to ends of the cam shafts 54, 55. In this embodiment, the drive motor 59 may be driven to change the volume of the combustion chamber 5 when the piston 4 is positioned at compression top dead center over a broad range. Note that the variable compression ratio mechanism A shown from FIG. 1 to FIG. 3 shows an example. Any type of variable compression ratio mechanism may be used.

Figure 4:
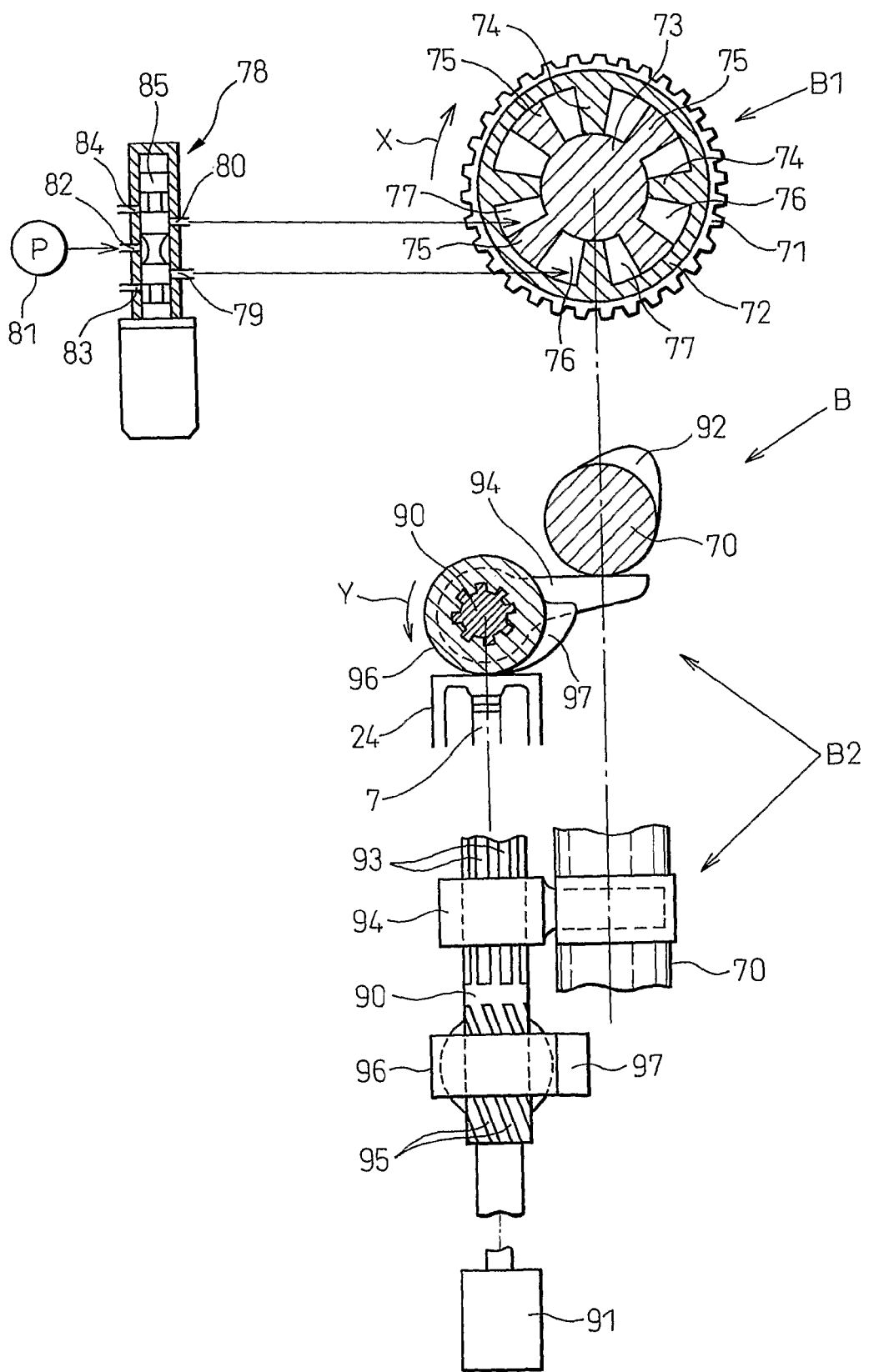
FIG. 4 is a view of a variable valve timing mechanism.

On the other hand, FIG. 4 shows a variable valve timing mechanism B provided at a cam shaft 70 for driving the intake valve 7 in FIG. 1. As shown in FIG. 4, the variable valve timing mechanism B is comprised of a cam phase changer B1 attached to one end of the cam shaft 70 and changing the phase of the cam of the cam shaft 70 and a cam actuation angle changer B2 arranged between the cam shaft 70 and the valve lifter 24 of the intake valve 7 and changing the working angle of the cams of the cam shaft 70 to different working angles for transmission to the intake valve 7. Note that FIG. 4 is a side sectional view and plan view of the cam actuation angle changer B2.

First, explaining the cam phase changer B1 of the variable valve timing mechanism B, this cam phase changer B1 is provided with a timing pulley 71 made to rotate by an engine crank shaft through a timing belt in the arrow direction, a cylindrical housing 72 rotating together with the timing pulley 71, a shaft 73 able to rotate together with a cam shaft 70 and rotate relative to the cylindrical housing 72, a plurality of partitions 74 extending from an inside circumference of the cylindrical housing 72 to an outside circumference of the shaft 73, and vanes 75 extending between the partitions 74 from the outside circumference of the shaft 73 to the inside circumference of the cylindrical housing 72, the two sides of the vanes 75 formed with advancing use hydraulic chambers 76 and retarding use hydraulic chambers 77.

The feed of working oil to the hydraulic chambers 76, 77 is controlled by a working oil feed control valve 78. This working oil feed control valve 78 is provided with hydraulic ports 79, 80 connected to the hydraulic chambers 76, 77, a feed port 82 for working oil discharged from a hydraulic pump 81, a pair of drain ports 83, 84, and a spool valve 85 for controlling connection and disconnection of the ports 79, 80, 82, 83, and 84.

To advance the phase of the cam of the cam shaft 70, in FIG. 4, the spool valve 85 is made to move downward, working oil fed from the feed port 82 is fed through the hydraulic port 79 to the hydraulic chambers for advancing 76, and working oil in the hydraulic chambers for retarding 77 is drained from the drain port 84. At this time, the shaft 73 is made to rotate relative to the cylindrical housing 72 in the arrow X-direction.

As opposed to this, to retard the phase of the cam of the cam shaft 70, in FIG. 4, the spool valve 85 is made to move upward, working oil fed from the feed port 82 is fed through the hydraulic port 80 to the hydraulic chambers for retarding 77, and working oil in the hydraulic chambers for advancing 76 is drained from the drain port 83. At this time, the shaft 73 is made to rotate relative to the cylindrical housing 72 in the direction opposite to the arrows X.

When the shaft 73 is made to rotate relative to the cylindrical housing 72, if the spool valve 85 is returned to the neutral position shown in FIG. 4, the operation for relative rotation of the shaft 73 is ended, and the shaft 73 is held at the relative rotational position at that time. Therefore, it is possible to use the cam phase changer B1 so as to advance or retard the phase of the cam of the cam shaft 70 by exactly the desired amount. That is, the cam phase changer B1 can freely advance or delay the opening timing of the intake valve 7.

Next, explaining the cam actuation angle changer B2 of the variable valve timing mechanism B, this cam actuation angle changer B2 is provided with a control rod 90 arranged in parallel with the cam shaft 70 and made to move by an actuator 91 in the axial direction, an intermediate cam 94 engaging with a cam 92 of the cam shaft 70 and slidingly fitting with a spline 93 formed on the control rod 90 and extending in the axial direction, and a sliding cam 96 engaging with a valve lifter 24 for driving the intake valve 7 and slidingly fitting with a spline 95 extending in a spiral formed on the control rod 90. The sliding cam 96 is formed with a cam 97.

When the cam shaft 90 rotates, the cam 92 causes the intermediate cam 94 to rock by exactly a constant angle at all times. At this time, the sliding cam 96 is also made to rock by exactly a constant angle. On the other hand, the intermediate cam 94 and sliding cam 96 are supported movably in the axial direction of the control rod 90, therefore when the control rod 90 is made to move by the actuator 91 in the axial direction, the sliding cam 96 is made to rotate relative to the intermediate cam 94.

When the cam 92 of the cam shaft 70 starts to engage with the intermediate cam 94 due to the relative rotational positional relationship between the intermediate cam 94 and sliding cam 96, if the cam 97 of the sliding cam 86 starts to engage with the valve lifter 24, as shown by a in FIG. 5(B), the opening time and lift of the intake valve 7 become maximum. As opposed to this, when the actuator 91 is used to make the sliding cam 96 rotate relative to the intermediate cam 94 in the arrow Y-direction of FIG. 4, the cam 92 of the cam shaft 70 engages with the intermediate cam 94, then after a while the cam 97 of the sliding cam 96 engages with the valve lifter 24. In this case, as shown by b in FIG. 5(B), the opening time and amount of lift of the intake valve 7 become smaller than a.

When the sliding cam 96 is made to rotate relative to the intermediate cam 94 in the arrow Y-direction of FIG. 4, as shown by c in FIG. 5(B), the opening time and amount of lift of the intake valve 7 become further smaller. That is, by using the actuator 91 to change the relative rotational position of the intermediate cam 94 and sliding cam 96, the opening time of the intake valve 7 can be freely changed. However, in this case, the amount of the lift of the intake valve 7 becomes smaller the shorter the opening time of the intake valve 7.

The cam phase changer B1 can be used to freely change the opening timing of the intake valve 7 and the cam actuation angle changer B2 can be used to freely change the opening time of the intake valve 7 in this way, so both the cam phase changer B1 and cam actuation angle changer B2, that is, the variable valve timing mechanism B, may be used to freely change the opening timing and opening time of the intake valve 7, that is, the opening timing and closing timing of the intake valve 7.

Note that the variable valve timing mechanism B shown in FIG. 1 and FIG. 4 show an example. It is also possible to use various types of variable valve timing mechanisms other than the example shown in FIG. 1 and FIG. 4.

Next, the meaning of the terms used in the present application will be explained with reference to FIG. 6. Note that FIGS. 6(A), (B), and (C) show for explanatory purposes an engine with a volume of the combustion chambers of 50 ml and a stroke volume of the piston of 500 ml. In these FIGS. 6(A), (B), and (C), the combustion chamber volume shows the volume of the combustion chamber when the piston is at compression top dead center.

FIG. 6(A) explains the mechanical compression ratio. The mechanical compression ratio is a value determined mechanically from the stroke volume of the piston and combustion chamber volume at the time of a compression stroke. This mechanical compression ratio is expressed by (combustion chamber volume+stroke volume)/combustion chamber volume. In the example shown in FIG. 6(A), this mechanical compression ratio becomes (50 ml+500 ml)/50 ml=11.

FIG. 6(B) explains the actual compression ratio. This actual compression ratio is a value determined from the actual stroke volume of the piston from when the compression action is actually started to when the piston reaches top dead center and the combustion chamber volume. This actual compression ratio is expressed by (combustion chamber volume+actual stroke volume)/combustion chamber volume. That is, as shown in FIG. 6(B), even if the piston starts to rise in the compression stroke, no compression action is performed while the intake valve is opened. The actual compression action is started after the intake valve closes. Therefore, the actual compression ratio is expressed as follows using the actual stroke volume. In the example shown in FIG. 6(B), the actual compression ratio becomes (50 ml+450 ml)/50 ml=10.

FIG. 6(C) explains the expansion ratio. The expansion ratio is a value determined from the stroke volume of the piston at the time of an expansion stroke and the combustion chamber volume. This expansion ratio is expressed by the (combustion chamber volume+stroke volume)/combustion chamber volume. In the example shown in FIG. 6(C), this expansion ratio becomes (50 ml+500 ml)/50 ml=11.

Next, the most basic features of the present invention will be explained with reference to FIG. 7 and FIG. 8. Note that FIG. 7 shows the relationship between the theoretical thermal efficiency and the expansion ratio, while FIG. 8 shows a comparison between the ordinary cycle and superhigh expansion ratio cycle used selectively in accordance with the load in the present invention.

FIG. 8(A) shows the ordinary cycle when the intake valve closes near the bottom dead center and the compression action by the piston is started from near substantially compression bottom dead center. In the example shown in this FIG. 8(A) as well, in the same way as the examples shown in FIGS. 6(A), (B), and (C), the combustion chamber volume is made 50 ml, and the stroke volume of the piston is made 500 ml. As will be understood from FIG. 8(A), in an ordinary cycle, the mechanical compression ratio is (50 ml+500 ml)/50 ml=11, the actual compression ratio is also about 11, and the expansion ratio also becomes (50 ml+500 ml)/50 ml=11. That is, in an ordinary internal combustion engine, the mechanical compression ratio and actual compression ratio and the expansion ratio become substantially equal.

Figure 7:
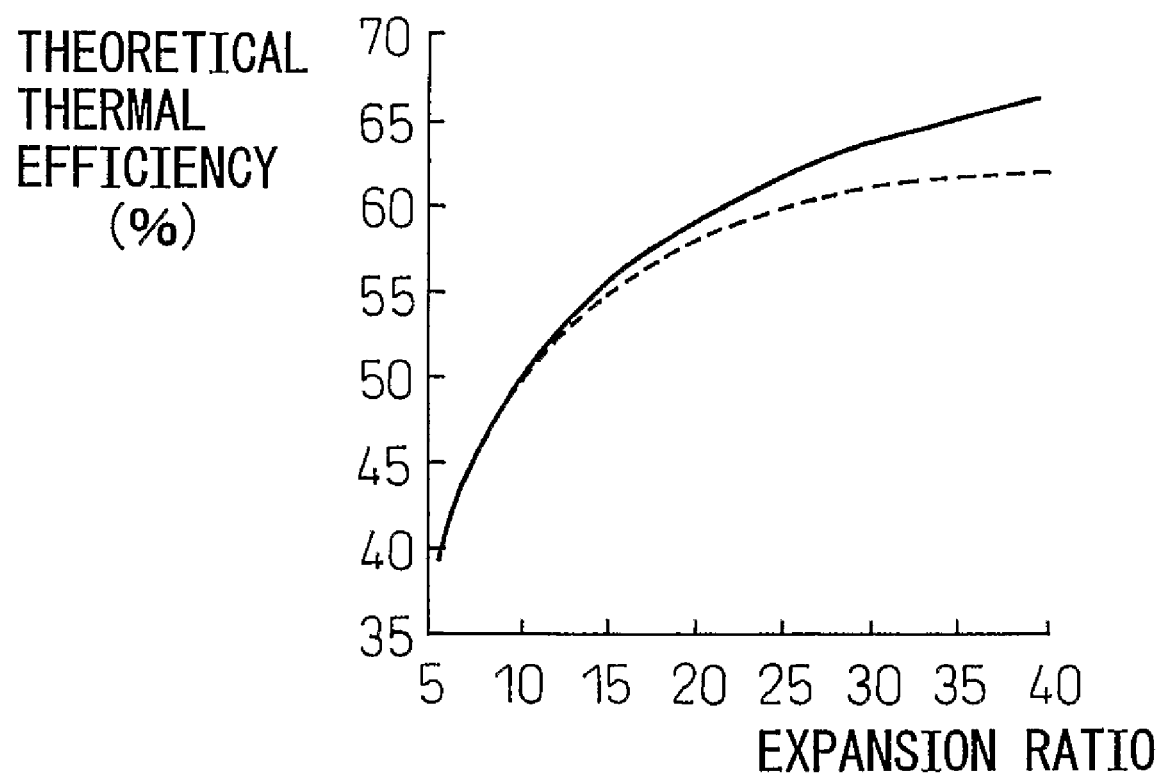
FIG. 7 is a view showing the relationship between the theoretical thermal efficiency and expansion ratio.
Figure 8:
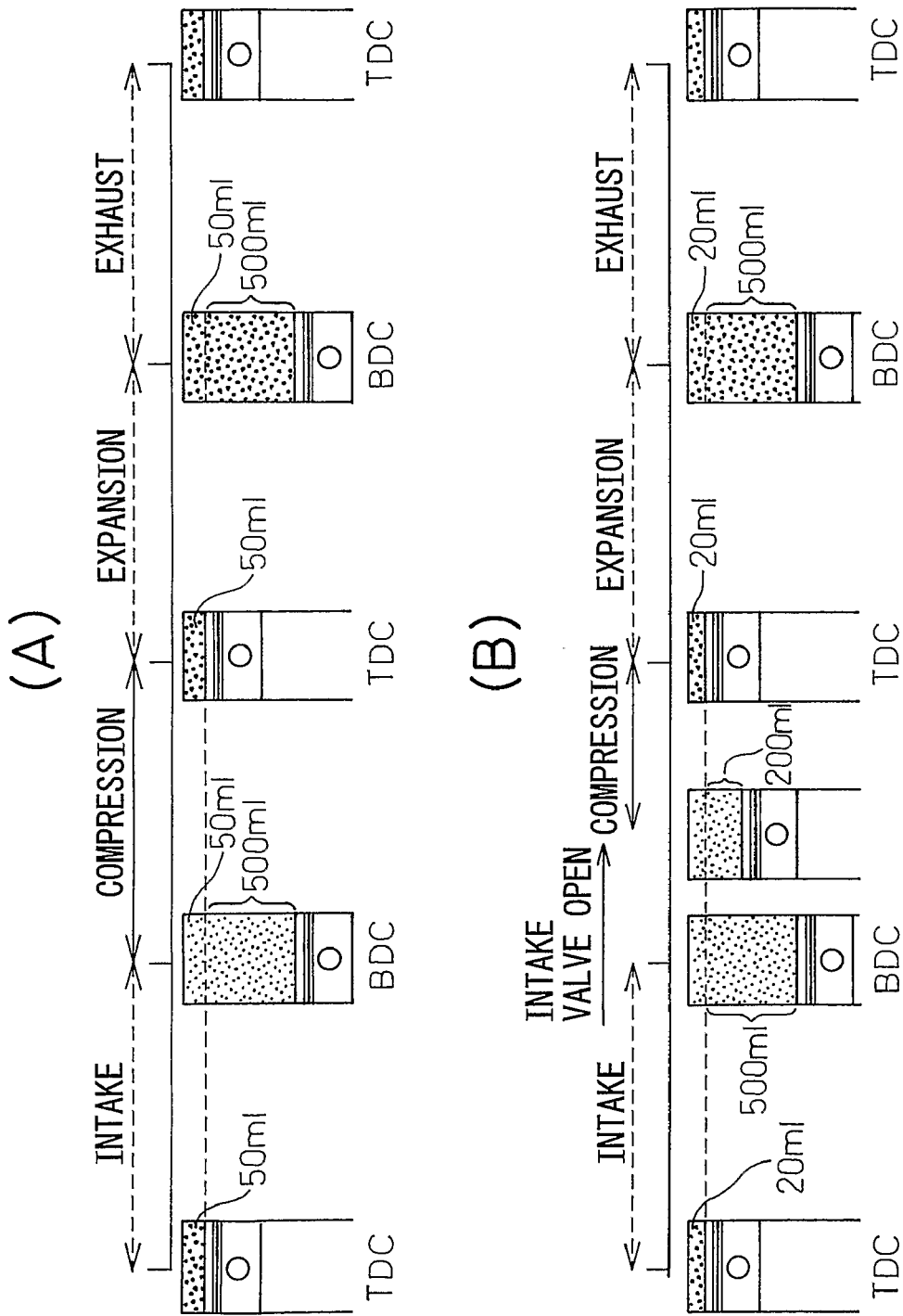
FIG. 8 is a view for explaining an ordinary cycle and superhigh expansion ratio cycle.

The solid line in FIG. 7 shows the change in the theoretical thermal efficiency in the case where the actual compression ratio and expansion ratio are substantially equal, that is, in the ordinary cycle. In this case, it is learned that the larger the expansion ratio, that is, the higher the actual compression ratio, the higher the theoretical thermal efficiency. Therefore, in an ordinary cycle, to raise the theoretical thermal efficiency, the actual compression ratio should be made higher. However, due to the restrictions on the occurrence of knocking at the time of engine high load operation, the actual compression ratio can only be raised even at the maximum to about 12, accordingly, in an ordinary cycle, the theoretical thermal efficiency cannot be made sufficiently high.

On the other hand, under this situation, the inventors strictly differentiated between the mechanical compression ratio and actual compression ratio and studied the theoretical thermal efficiency and as a result discovered that in the theoretical thermal efficiency, the expansion ratio is dominant, and the theoretical thermal efficiency is not affected much at all by the actual compression ratio. That is, if raising the actual compression ratio, the explosive force rises, but compression requires a large energy, accordingly even if raising the actual compression ratio, the theoretical thermal efficiency will not rise much at all.

As opposed to this, if increasing the expansion ratio, the longer the period during which a force acts pressing down the piston at the time of the expansion stroke, the longer the time that the piston gives a rotational force to the crankshaft. Therefore, the larger the expansion ratio is made, the higher the theoretical thermal efficiency becomes. The broken line in FIG. 7 shows the theoretical thermal efficiency in the case of fixing the actual compression ratio at 10 and raising the expansion ratio in that state. In this way, it is learned that the amount of rise of the theoretical thermal efficiency when raising the expansion ratio in the state where the actual compression ratio is maintained at a low value and the amount of rise of the theoretical thermal efficiency in the case where the actual compression ratio is increased along with the expansion ratio as shown by the solid line of FIG. 7 will not differ that much.

If the actual compression ratio is maintained at a low value in this way, knocking will not occur, therefore if raising the expansion ratio in the state where the actual compression ratio is maintained at a low value, the occurrence of knocking can be prevented and the theoretical thermal efficiency can be greatly raised. FIG. 8(B) shows an example of the case when using the variable compression ratio mechanism A and variable valve timing mechanism B to maintain the actual compression ratio at a low value and raise the expansion ratio.

Referring to FIG. 8(B), in this example, the variable compression ratio mechanism A is used to lower the combustion chamber volume from 50 ml to 20 ml. On the other hand, the variable valve timing mechanism B is used to delay the closing timing of the intake valve until the actual stroke volume of the piston changes from 500 ml to 200 ml. As a result, in this example, the actual compression ratio becomes (20 ml+200 ml)/20 ml=11 and the expansion ratio becomes (20 ml+500 ml)/20 ml=26. In the ordinary cycle shown in FIG. 8(A), as explained above, the actual compression ratio is about 11 and the expansion ratio is 11. Compared with this case, in the case shown in FIG. 8(B), it is learned that only the expansion ratio is raised to 26. This is the reason that it is called the "superhigh expansion ratio cycle".

As explained above, generally speaking, in an internal combustion engine, the lower the engine load, the worse the thermal efficiency, therefore to improve the thermal efficiency at the time of vehicle operation, that is, to improve the fuel consumption, it becomes necessary to improve the thermal efficiency at the time of engine low load operation. On the other hand, in the superhigh expansion ratio cycle shown in FIG. 8(B), the actual stroke volume of the piston at the time of the compression stroke is made smaller, so the amount of intake air which can be sucked into the combustion chamber 5 becomes smaller, therefore this superhigh expansion ratio cycle can only be employed when the engine load is relatively low. Therefore, in the present invention, at the time of engine low load operation, the superhigh expansion ratio cycle shown in FIG. 8(B) is set, while at the time of engine high load operation, the ordinary cycle shown in FIG. 8(A) is set. This is the basic feature of the present invention.

Figure 9:
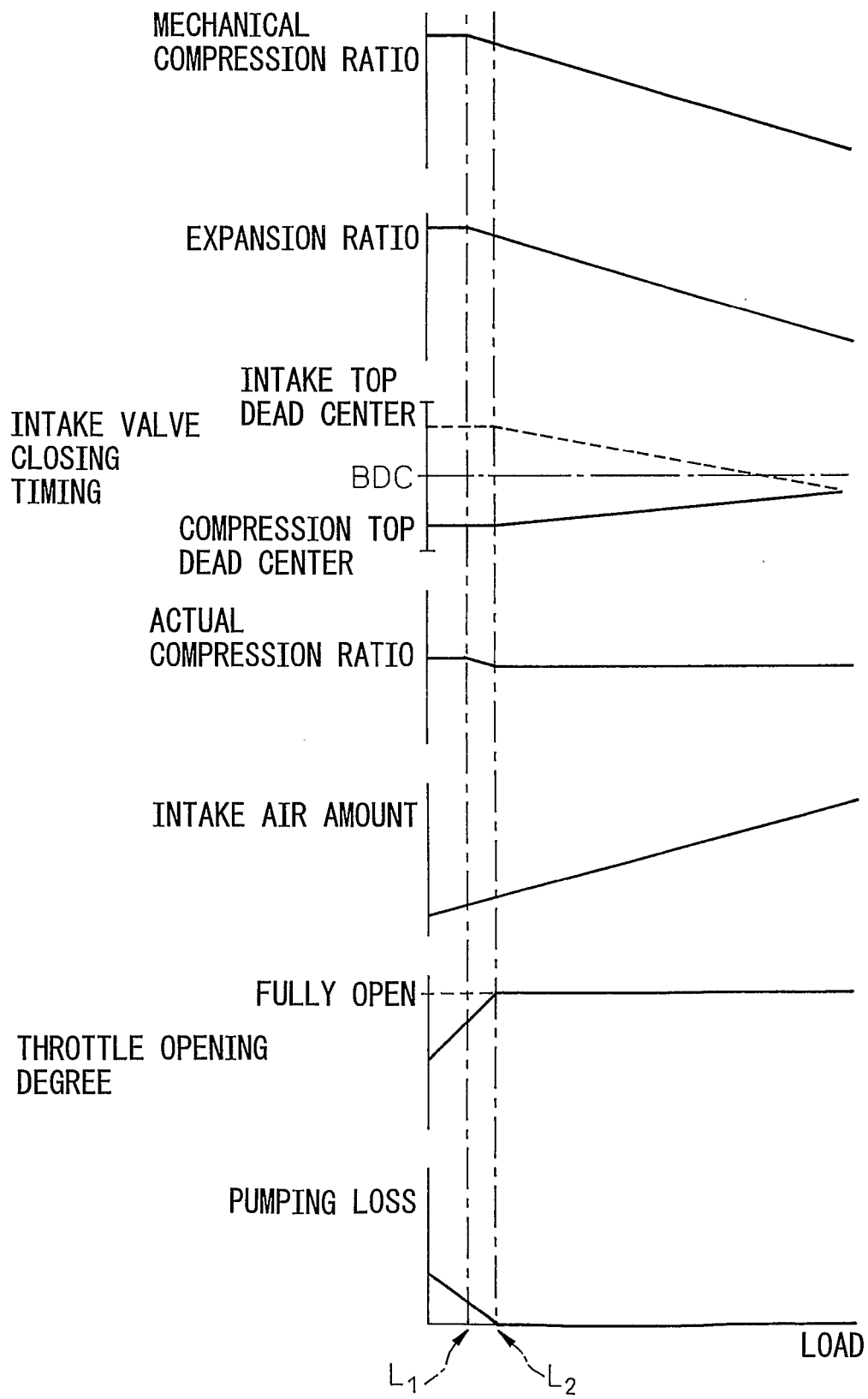
FIG. 9 is a view showing the change in mechanical compression ratio etc. in accordance with the engine load.

FIG. 9 shows the operational control as a whole at the time of steady operation when the engine speed is low. Below, the operational control as a whole will be explained with reference to FIG. 9.

FIG. 9 shows the changes in the mechanical compression ratio expansion ratio, closing timing of the intake valve 7, actual compression ratio, the amount of intake air, opening degree of the throttle valve 17, and pumping loss along with the engine load. Note that in the embodiment according to the present invention, ordinarily the average air-fuel ratio in the combustion chamber 5 is feedback controlled to the stoichiometric air-fuel ratio based on the output signal of the air-fuel ratio sensor 21 so that the three-way catalyst in the catalytic converter 20 can simultaneously reduce the unburned HC, CO, and $NO_x$ in the exhaust gas.

Now, as explained above, at the time of engine high load operation, the ordinary cycle shown in FIG. 8(A) is executed. Therefore, as shown in FIG. 9, at this time, since the mechanical compression ratio is made low, the expansion ratio becomes low. As shown by the solid line in FIG. 9, the closing timing of the intake valve 7 is advanced as shown by the solid line in FIG. 5. Further, at this time, the amount of intake air is large. At this time, the opening degree of the throttle valve 17 is maintained fully opened or substantially fully opened, so the pumping loss becomes zero.

On the other hand, as shown in FIG. 9, along with the reduction in the engine load, the mechanical compression ratio is increased, therefore the expansion ratio is also increased. Further, at this time, the closing timing of the intake valve 7 is delayed as the engine load becomes lower as shown by the solid line in FIG. 9 so that the actual compression ratio is held substantially constant. Note that at this time as well, the throttle valve 17 is held at the fully opened or substantially fully opened state. Therefore the amount of intake air fed to the combustion chamber 5 is controlled not by the throttle valve 17, but by changing the closing timing of the intake valve 7. At this time as well, the pumping loss becomes zero.

In this way when the engine load becomes lower from the engine high load operating state, the mechanical compression ratio is increased along with the fall in the amount of intake air under a substantially constant actual compression ratio. That is, the volume of the combustion chamber 5 when the piston 4 reaches compression top dead center is reduced proportionally to the reduction in the amount of intake air. Therefore the volume of the combustion chamber 5 when the piston 4 reaches compression top dead center changes proportionally to the amount of intake air. Note that at this time, the air-fuel ratio in the combustion chamber 5 becomes the stoichiometric air-fuel ratio, so the volume of the combustion chamber 5 when the piston 4 reaches compression top dead center changes proportionally to the amount of fuel.

If the engine load becomes further lower, the mechanical compression ratio is further increased. When the mechanical compression ratio reaches the limit mechanical compression ratio forming the structural limit of the combustion chamber 5, in the region of a load lower than the engine load $L_1$ when the mechanical compression ratio reaches the limit mechanical compression ratio, the mechanical compression ratio is held at the limit engine compression ratio. Therefore at the time of engine low load operation, the mechanical compression ratio becomes maximum, and the expansion ratio also becomes maximum. Putting this another way, in the present invention, so as to obtain the maximum expansion ratio at the time of engine low load operation, the mechanical compression ratio is made maximum. Further, at this time, the actual compression ratio is maintained at an actual compression ratio substantially the same as that at the time of engine medium and high load operation.

On the other hand, as shown by the solid line in FIG. 9, the closing timing of the intake valve 7 is delayed to the limit closing timing enabling control of the amount of intake air fed to the combustion chamber 5 as the engine load becomes lower. In the region of a load lower than the engine load $L_2$ when the closing timing of the intake valve 7 reaches the limit closing timing, the closing timing of the intake valve 7 is held at the limit closing timing. If the closing timing of the intake valve 7 is held at the limit closing timing, the amount of intake air will no longer be able to be controlled by the change of the closing timing of the intake valve 7. Therefore, the amount of intake air has to be controlled by some other method.

In the embodiment shown in FIG. 9, at this time, that is, in the region of a load lower than the engine load $L_2$ when the closing timing of the intake valve 7 reaches the limit closing timing, the throttle valve 17 is used to control the amount of intake air fed to the combustion chamber 5. However, if using the throttle valve 17 to control the amount of intake air, as shown in FIG. 9, the pumping loss increases.

Note that to prevent this pumping loss, in the region of a load lower than the engine load $L_2$ when the closing timing of the intake valve 7 reaches the limit closing timing, the throttle valve 17 is held in the fully opened or substantially fully opened. In that state, the lower the engine load, the larger the air-fuel ratio may be made. At this time, the fuel injector 13 is preferably arranged in the combustion chamber 5 to perform stratified combustion.

As shown in FIG. 9, at the time of engine low speed, regardless of the engine load, the actual compression ratio is held substantially constant. The actual compression ratio at this time is made the range of the actual compression ratio about at the time of engine medium and high load operation ±10 percent, preferably ±5 percent. Note that in the embodiment according to the present invention, the actual compression ratio at the time of engine low speed is made about 10±1, that is, from 9 to 11. However, if the engine speed becomes higher, the air-fuel mixture in the combustion chamber 5 is disturbed, so knocking becomes difficult, therefore in the embodiment according to the present invention, the higher the engine speed, the higher the actual compression ratio.

On the other hand, as explained above, in the superhigh expansion ratio cycle shown in FIG. 8(B), the expansion ratio is made 26. The higher this expansion ratio, the better, but if 20 or more, a considerably high theoretical thermal efficiency can be obtained.

Therefore, in the present invention, the variable compression ratio mechanism A is formed so that the expansion ratio becomes 20 or more.

Further, in the example shown in FIG. 9, the mechanical compression ratio is changed continuously in accordance with the engine load. However, the mechanical compression ratio can also be changed in stages in accordance with the engine load.

On the other hand, as shown by the broken line in FIG. 9, even if advancing the closing timing of the intake valve 7 as the engine load becomes lower, the amount of intake air can be controlled without depending on the throttle valve 17. Therefore, in FIG. 9, if comprehensively expressing both the case shown by the solid line and the case shown by the broken line, in the embodiment according to the present invention, the closing timing of the intake valve 7 is shifted as the engine load becomes lower in a direction away from intake bottom dead center BDC until the limit closing timing $L_2$ enabling control of the amount of intake air fed into the combustion chamber.

Next, the time of low load operation where the high expansion ratio cycle is executed as shown by FIG. 8(B) will be focused on to explain the opening timing of the intake valve 7.

FIG. 10(A) shows the change in lift of the intake valve 7, the change in lift of the exhaust valve 9, and the piston interference line showing the boundary where the intake valve 7 or exhaust valve 9 interferes with the piston 4 when the mechanical compression ratio is high at the time of engine low load operation. In FIG. 10(A), when the lift curve of the exhaust valve 9 intersects with the piston interference line, the exhaust valve 9 interferes with the piston 4, while when the lift curve of the intake valve 7 intersects with the piston interference line, the intake valve 7 interferes with the piston 4.

Therefore, in FIG. 10(A), the noninterference region θ with respect to the opening timing of the intake valve 7 where the intake valve 7 will not interfere with the piston 4 becomes from about intake top dead center (TDC) on. Therefore, in the present invention, the opening timing of the intake valve 7 is set in this noninterference region θ.

On the other hand, if making the intake valve 7 open after intake top dead center, the inside of the combustion chamber 5 will become a vacuum pressure and accordingly pumping loss will occur until the intake valve 7 opens. This pumping loss becomes larger the more the opening timing of the intake valve 7 is delayed from intake top dead center. Therefore, in the present invention, the target opening timing of the intake valve 7 is maintained at about intake top dead center, preferably slightly before intake top dead center in the noninterference region θ.

Further, when the mechanical compression ratio is high at the time of engine low load operation, the amount of intake air to be fed inside the combustion chamber 5 becomes small, therefore at this time, as shown by the solid line in FIG. 10(A), the closing timing of the intake valve 7 is considerably delayed or as shown by the broken line in FIG. 10(A), the closing timing of the intake valve 7 is considerably advanced. Note that in the embodiment according to the present invention, the closing timing of the exhaust valve 9 is fixed at substantially intake top dead center.

On the other hand, FIG. 10(B) shows the change in lift of the intake valve 7, the change in lift of the exhaust valve 9, and the piston interference line in a certain operating state at the time of engine medium and high speed medium and high load operation. At the time of engine medium and high load operation, the mechanical compression ratio becomes smaller, so the piston interference line rises. Therefore, at this time, it is not necessary to be careful about interference with the piston 4. Further, at the time of the operating state shown in FIG. 10(B), the opening timing of the intake valve 7 becomes considerably before intake top dead center (TDC) and the closing timing of the intake valve 7 is advanced compared with the case shown by the solid line in FIG. 10(A) and is made delayed compared with the case shown by the broken line in FIG. 10(A).

However, as explained above, at the time of the operating state shown in FIG. 10(B), the opening timing of the intake valve 7 becomes considerably before intake top dead center, while at the time of the operating state shown in FIG. 10(A), the opening timing of the intake valve 7 becomes substantially intake top dead center. Therefore, when the operating condition of the engine changes from the operating state shown in FIG. 10(B) to the operating state shown in FIG. 10(A), the opening timing of the intake valve 7 has to be delayed, while when the operating condition of the engine changes from the operating state shown in FIG. 10(A) to the operating state shown in FIG. 10(B), the opening timing of the intake valve 7 has to be advanced.

On the other hand, when the operating condition of the engine changes from the operating state shown in FIG. 10(B) to the operating state shown in FIG. 10(A), the closing timing of the intake valve 7 is changed to reduce the amount of intake air to be fed inside the combustion chamber 5 and increase the mechanical compression ratio, while when the operating condition of the engine is changed from the operating state shown in FIG. 10(A) to the operating state shown in FIG. 10(B), similarly the closing timing of the intake valve 7 is changed to increase the amount of intake air to be fed inside the combustion chamber 5 and reduce the mechanical compression ratio.

However, as explained above, when reducing the amount of intake air to be fed inside the combustion chamber 5 and increasing the mechanical compression ratio, if the mechanical compression ratio is made large before the amount of intake air is sufficiently reduced, that is, while the amount of intake air is large, the actual compression ratio will become high and accordingly knocking will occur. On the other hand, as explained above, when increasing the amount of intake air to be fed inside the combustion chamber 5 and reducing the mechanical compression ratio, if increasing the amount of intake air while the mechanical compression ratio has not fallen, the actual compression ratio will become high and accordingly knocking will occur.

In the embodiment according to the present invention, to prevent the occurrence of this knocking, a time lag is given between the actuation of the variable compression ratio mechanism A and the actuation of the variable valve timing mechanism B. Next, this will be explained with reference to FIG. 11 and FIG. 12 taking as an example making the amount of lift of the intake valve 7 the amount of lift shown by the solid line in FIG. 10(A) at the time of engine low load operation.

Figure 11:
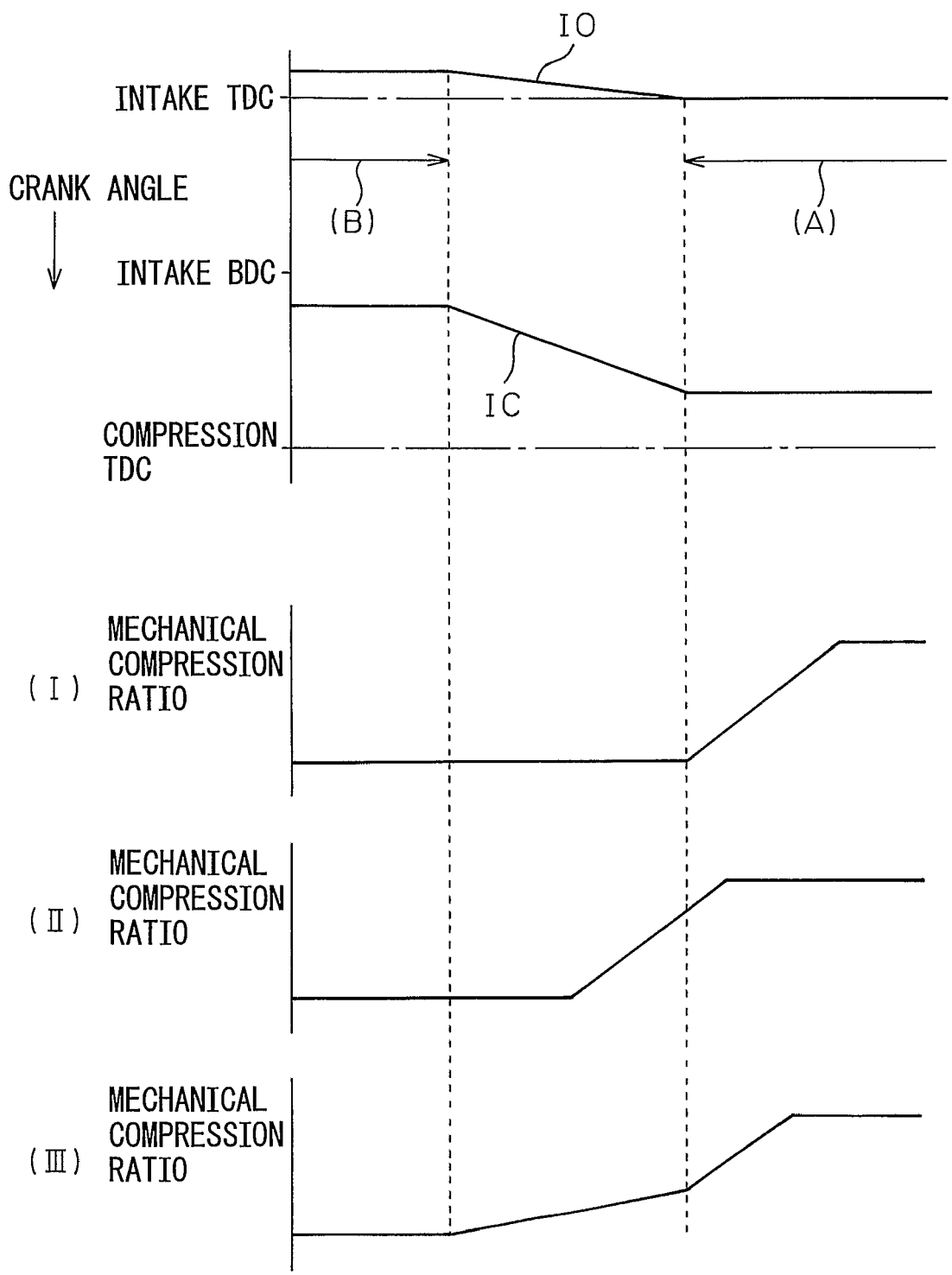
FIG. 11 is a view showing the change in the opening timing IO and the closing timing IC of the intake valve and the mechanical compression ratio.

FIG. 11 shows the change of the opening timing IO of the intake valve 7, the change of the closing timing IC of the intake valve 7, and the change of the mechanical compression ratio when the operating condition of the engine changes from the operating state shown in FIG. 10(B) to the operating state shown in FIG. 10(A). Note that in FIG. 11, (B) shows the operating state as shown in FIG. 11(B), while (A) shows the operating state as shown in FIG. 11(A).

Note that FIG. 11 shows the case where the operation for changing the opening timing IO of the intake valve 7 and the operation for changing the closing timing IC by the variable valve timing mechanism B are simultaneously started and are simultaneously ended when the operating condition of the engine changes from the operating state shown in FIG. 10(B) to the operating state shown in FIG. 10(A).

Referring to FIG. 11, when the operating condition of the engine shifts from the medium and high speed medium and high load operation shown in FIG. 10(B) to the low load operation shown in FIG. 10(A), in the example shown in (I), the operation for changing the mechanical compression ratio, that is, the operation for increasing it, is started after the opening timing IO of the intake valve 7 becomes the target opening timing in the noninterference region B. On the other hand, in the example shown in (II), the operation for changing the mechanical compression ratio, that is, the operation for increasing it, is started after the operation for changing the opening timing IO of the intake valve 7 is started and before the opening timing IO of the intake valve 7 becomes the target opening timing in the noninterference region θ. Further, in the example shown in (III), the operation for changing the mechanical compression ratio is started when the operation for changing the opening timing IO of the intake valve 7 is started, but at this time, the speed of change of the mechanical compression ratio is made slower.

If comprehensively expressing the operations for changing the mechanical compression ratio shown in (I), (II), and (III) of FIG. 11, when the operating condition of the engine shifts from the medium and high speed medium and high load operation shown in FIG. 10(B) to the low load operation shown in FIG. 10(A), the operation for changing the mechanical compression ratio is delayed from the operation for changing the opening timing IO of the intake valve 7 so that the mechanical compression ratio becomes maximum after the opening timing IO of the intake valve 7 becomes the target opening timing in the noninterference region θ.

If the operation for changing the mechanical compression ratio is delayed from the operation for changing the opening timing IO of the intake valve 7 in this way, the mechanical compression ratio is not made high before the amount of intake air fed to the combustion chamber 5 is reduced, accordingly knocking can be prevented.

Figure 12:
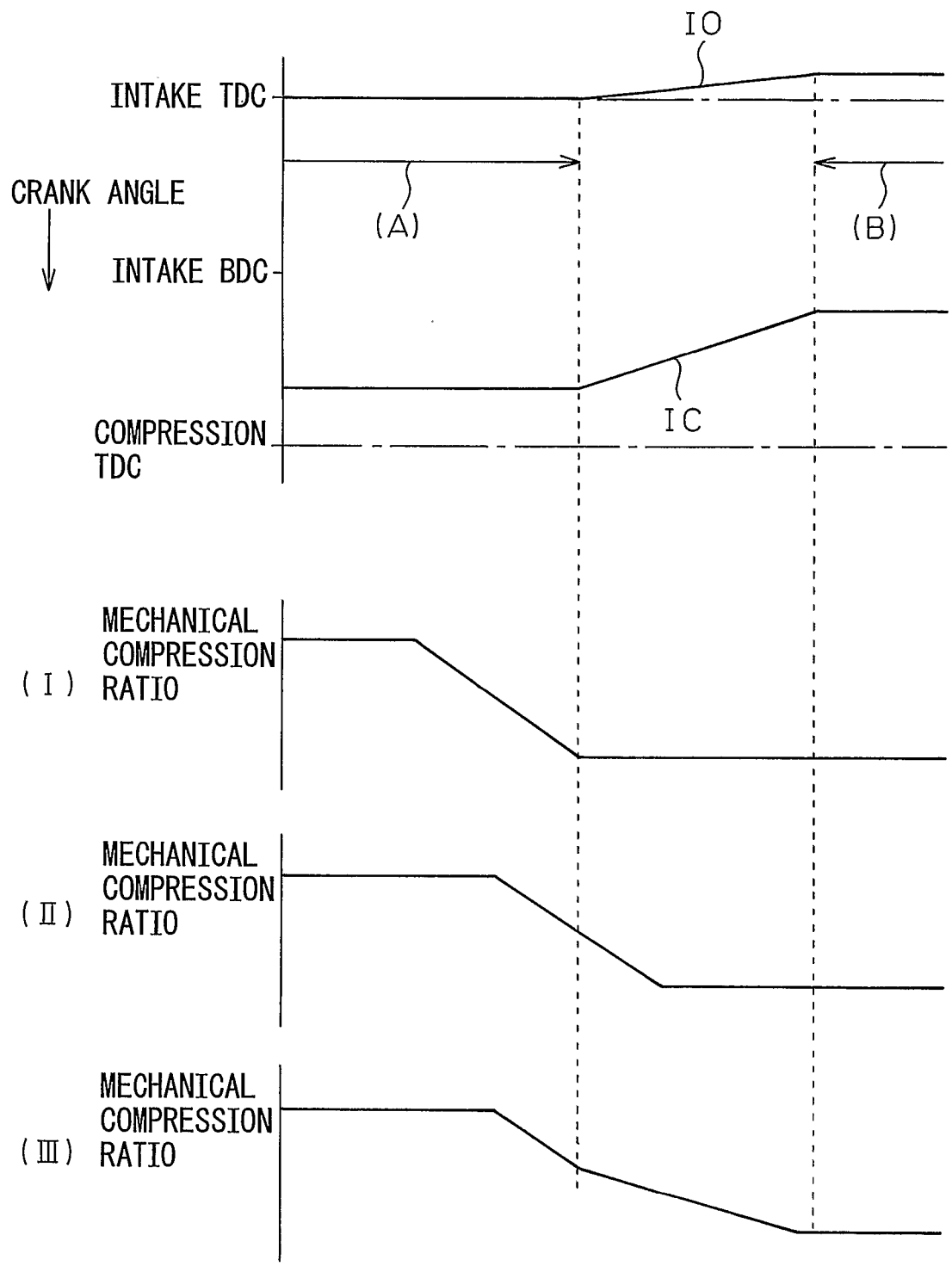
FIG. 12 is a view showing the change in the opening timing IO and the closing timing IC of the intake valve and the mechanical compression ratio.

FIG. 12 shows the change of the opening timing IO of the intake valve 7, the change of the closing timing IC of the intake valve 7, and the change of the mechanical compression ratio when the operating condition of the engine changes from the operating state shown in FIG. 10(A) to the operating state shown in FIG. 10(B). Note that in FIG. 11, (A) shows the operating state shown in FIG. 11(A), while (B) shows the operating state shown in FIG. 11(B).

Note that FIG. 12, like FIG. 11, also shows the case where the variable valve timing mechanism B is used so that the operation for changing the opening timing IO of the intake valve 7 and the operation for changing the closing timing IC are simultaneously started and are simultaneously made to end when the operating condition of the engine changes from the operating state shown in FIG. 10(A) to the operating state shown in FIG. 10(B).

Referring to FIG. 12, when the operating condition of the engine shifts from the low load operation shown in FIG. 10(A) to the medium and high speed medium and high load operation shown in FIG. 10(B), in the example shown in (I), the operation for changing the opening timing IO of the intake valve 7 is started after the mechanical compression ratio falls to the target mechanical compression ratio in accordance with the engine operating state. On the other hand, in the example shown in (II), the operation for changing the opening timing IO of the intake valve 7 is started while the mechanical compression ratio is falling to the target mechanical compression ratio in accordance with the engine operating state. Further, in the example shown in (III), the operation for changing the opening timing IO of the intake valve 7 is started while the mechanical compression ratio is falling to the target mechanical compression ratio in accordance with the engine operating state, but in this example, the speed of change of the mechanical compression ratio, that is, the speed of fall, is made slower when the operation for changing the opening timing IO of the intake valve 7 is started.

If comprehensively expressing the operations for changing the mechanical compression ratio shown in (I), (II), and (III) of FIG. 12, when the operating condition of the engine shifts from the low load operation shown in FIG. 10(A) to the medium and high speed medium and high load operation shown in FIG. 10(B), the operation for changing the opening timing IO of the intake valve 7 is started after the operation for changing the mechanical compression ratio for reducing the mechanical compression ratio is started.

In this way if the operation for changing the opening timing of the intake valve is started after the operation for changing the mechanical compression ratio is started, when the mechanical compression ratio is high, the amount of intake air fed to the combustion chamber 5 will not be increased and accordingly knocking can be prevented.

Figure 13:
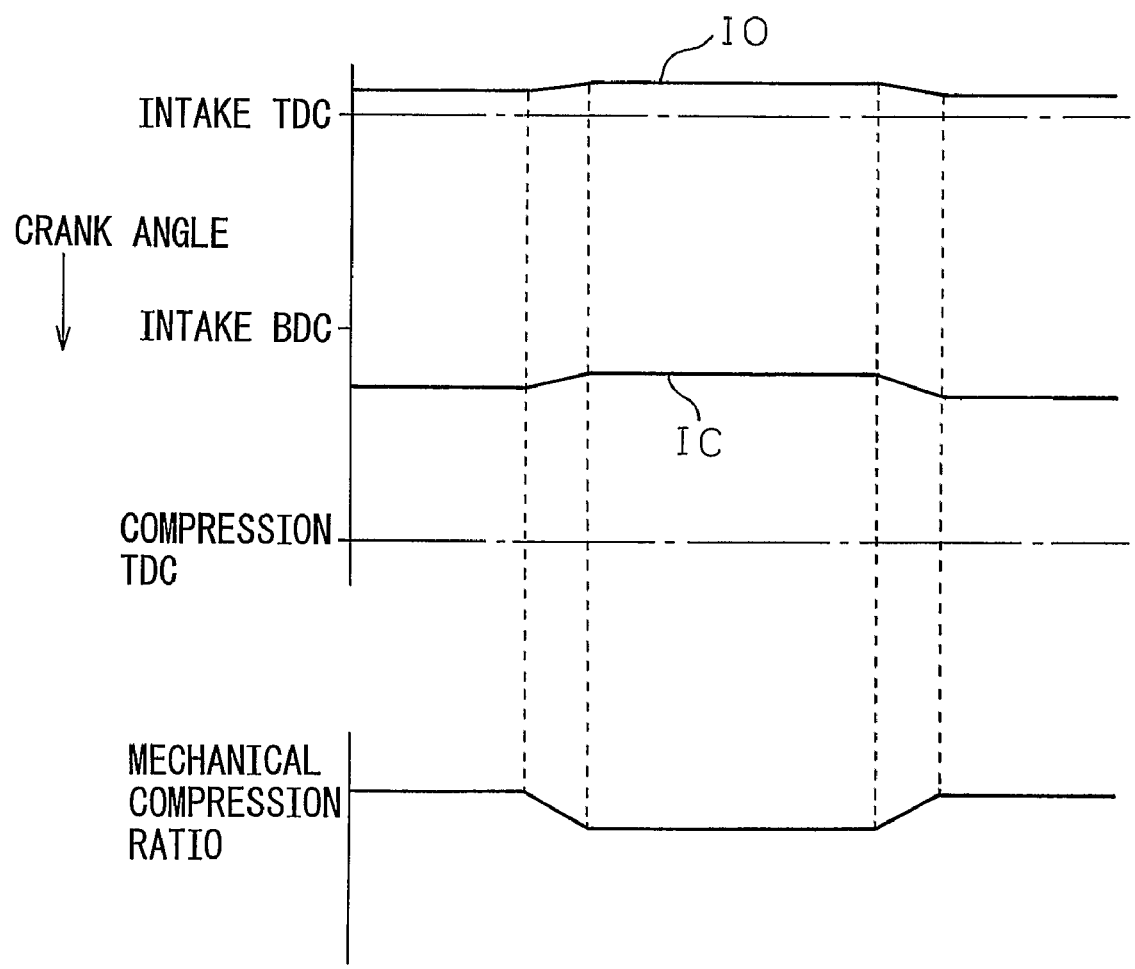
FIG. 13 is a view showing the change in the opening timing IO and the closing timing IC of the intake valve and the mechanical compression ratio.

FIG. 13 shows when the amount of change of the engine load is small and therefore the changes of the opening timing IO of the intake valve 7, the closing timing IC of the intake valve 7, and the mechanical compression ratio are small. At this time, as shown in FIG. 13, the operation for changing the opening timing IO of the intake valve 7, the operation for changing the closing timing IC of the intake valve 7, and the operation for changing the mechanical compression ratio are simultaneously started and substantially simultaneously ended.

Referring to FIG. 14, the target opening timing IO of the intake valve 7 is stored as a function of the engine load L and engine speed N in the form of a map as shown in FIG. 14(A) in advance in the ROM 32. Further, the target closing timing IC of the intake valve 7 required for feeding the required amount of intake air into the combustion chamber 5 is stored as a function of the engine load L and engine speed N in the form of a map as shown in FIG. 14(B) in advance in the ROM 32.

On the other hand, FIG. 14(D) shows the relationship between the target actual compression ratio for the engine speeds $N_1$, $N_2$, $N_3$, $N_4$ ($N_1 < N_2 < N_3 < N_4$) and the engine load L. As explained above, as shown by $N_1$ of FIG. 14(D), at the time of engine low speed, the target actual compression ratio is held substantially constant regardless of the engine load L and the target actual compression ratio becomes the higher the higher the engine speed. Note that the mechanical compression ratio CR required for making the actual compression ratio this target actual compression ratio is stored as a function of the engine load L and engine speed N in the form of a map as shown in FIG. 14(C) in advance in the ROM 32.

Next, the operation control routine will be explained with reference to FIG. 15.

Referring to FIG. 15, first, at step 100, it is judged whether the engine load L is higher than the load $L_2$ shown in FIG. 9. When $L \geq L_2$, the routine proceeds to step 101 where the map shown in FIG. 14(A) is used to calculate the opening timing IO of the intake valve 7 and the map shown in FIG. 14(B) is used to calculate the closing timing IC of the intake valve 7. Next, the routine proceeds to step 104. As opposed to this, when it is judged at step 100 that $L < L_2$, the routine proceeds to step 102 where the closing timing of the intake valve 7 is made the limit closing timing, then at step 103, the amount of intake air is controlled by the throttle valve 19. Next, the routine proceeds to step 104.

At step 104, it is judged if the engine load L is lower than the load $L_1$ shown in FIG. 9. When $L \geq L_1$, the routine proceeds to step 105 where the map shown in FIG. 14(C) is used to calculate the mechanical compression ratio CR. Next, the routine proceeds to step 107. On the other hand, when it is judged at step 104 that $L < L_1$, the routine proceeds to step 106 where the mechanical compression ratio CR is made the limit mechanical compression ratio. Next, the routine proceeds to step 107.

At step 107, it is judged if the absolute value $|\Delta L|$ of the amount of change $\Delta L$ of the engine load is larger than a set value XL. When $|\Delta L| > XL$, the routine proceeds to step 108 where it is judged if the amount of change $\Delta L$ of the engine load is negative. When $\Delta L < 0$, that is, when the engine load falls by the set value XL or more, the routine proceeds to step 109 where the opening timing IO and closing timing IC of the intake valve 7 are changed as shown in FIG. 11 by driving the variable valve timing mechanism B and the pattern of change of any of (I), (II), and (III) of FIG. 11 is used to change the mechanical compression ratio by driving the variable compression ratio mechanism A delayed from the operation for changing the opening timing IO and closing timing IC of the intake valve 7.

As opposed to this, when it is judged at step 108 that $\Delta L \geq 0$, that is, when the engine load increases by the set value XL or more, the routine proceeds to step 110 where the pattern of change of any of (I), (II), and (III) of FIG. 12 is used to change the mechanical compression ratio by driving the variable compression ratio mechanism A. As shown in FIG. 12, the opening timing IO and closing timing IC of the intake valve 7 are changed by driving the variable valve timing mechanism B delayed from the operation for changing the mechanical compression ratio.

On the other hand, when it is judged at step 107 that $|\Delta L| \leq XL$, that is, when the amount of change $\Delta L$ of the engine load is small, the routine proceeds to step 111 where, as shown in FIG. 13, the operation for changing the opening timing IO of the intake valve 7, the operation for changing the closing timing IC of the intake valve 7, and the operation for changing the mechanical compression ratio are simultaneously started and substantially simultaneously ended by driving the variable compression ratio mechanism A and variable valve timing mechanism B.

LIST OF REFERENCE NOTATIONS

1 . . . crank case
2 . . . cylinder block
3 . . . cylinder head
4 . . . piston
5 . . . combustion chamber
7 . . . intake valve
70 . . . intake valve drive cam shaft
A . . . variable compression ratio mechanism
B . . . variable valve timing mechanism

The invention claimed is:
1. A spark ignition type internal combustion engine comprising:

a variable compression ratio mechanism able to change a mechanical compression ratio;

a variable valve timing mechanism able to individually control an opening timing and closing timing of an intake valve; and a controller that is programmed to:

shift the closing timing of the intake valve in a direction away from intake bottom dead center the lower the engine load to feed an amount of suction air in accordance with the required load into a combustion chamber, make the mechanical compression ratio maximum so that the maximum expansion ratio of 20 or more is obtained at the time of engine low load operation, and maintain the opening timing of the intake valve at a target opening timing of substantially intake top dead center in a noninterference region where a piston is not interfered with at least during the time in which the mechanical compression ratio is made maximum, the variable valve timing mechanism being configured to control the opening timing independent of the operation of the variable compression ratio mechanism.

2. A spark ignition type internal combustion engine as set forth in claim 1, wherein the controller is programmed to make an actual compression ratio at the time of engine low load operation an actual compression ratio substantially the same as that at the time of engine medium and high load operation.

3. A spark ignition type internal combustion engine as set forth in claim 2, wherein, at the time of engine low speed, regardless of the engine load, the controller is programmed to make said actual compression ratio a range of about ±10% with respect to the actual compression ratio at the time of engine medium and high load operation.

4. A spark ignition type internal combustion engine as set forth in claim 2, wherein the higher the engine speed, the higher the actual compression ratio.

5. A spark ignition type internal combustion engine as set forth in claim 1, wherein when the operating condition of the engine shifts from a medium and high speed medium and high load operation to a low load operation where the mechanical compression ratio is made maximum, the controller is programmed to delay the operation for changing the mechanical compression ratio from the operation for changing the opening timing of the intake valve so that the mechanical compression ratio becomes maximum after the opening timing of the intake valve becomes a target opening timing in said noninterference region.

6. A spark ignition type internal combustion engine as set forth in claim 5, wherein when the operating condition of the engine shifts from a medium and high speed medium and high load operation to a low load operation where the mechanical compression ratio is made maximum, the controller is programmed to start the operation for changing the mechanical compression ratio after the opening timing of the intake valve becomes a target opening timing in said noninterference region.

7. A spark ignition type internal combustion engine as set forth in claim 5, wherein when the operating condition of the engine shifts from a medium and high speed medium and high load operation to a low load operation where the mechanical compression ratio is made maximum, the controller is programmed to start the operation for changing the mechanical compression ratio after the operation for changing the opening timing of the intake valve is started and before the opening timing of the intake valve becomes a target opening timing in said noninterference region.

8. A spark ignition type internal combustion engine as set forth in claim 5, wherein when the operating condition of the engine shifts from a medium and high speed medium and high load operation to a low load operation where the mechanical compression ratio is made maximum, the controller is programmed to delay the speed of change of the mechanical compression ratio.

9. A spark ignition type internal combustion engine as set forth in claim 1, wherein when the operating condition of the engine shifts from a low load operation where the mechanical compression ratio is made maximum to a medium and high speed medium and high load operation, the controller is programmed to start the operation for changing the opening timing of the intake valve after the operation for changing the mechanical compression ratio to lower the mechanical compression ratio is started.

10. A spark ignition type internal combustion engine as set forth in claim 9, wherein when the operating condition of the engine shifts from a low load operation where the mechanical compression ratio is made maximum to a medium and high speed medium and high load operation, the controller is programmed to start the operation for changing the opening timing of the intake valve after the mechanical compression ratio falls to a target mechanical compression ratio according to the engine operating state.

11. A spark ignition type internal combustion engine as set forth in claim 9, wherein when the operating condition of the engine shifts from a low load operation where the mechanical compression ratio is made maximum to a medium and high speed medium and high load operation, the controller is programmed to start the operation for changing the opening timing of the intake valve while the mechanical compression ratio is falling to a target mechanical compression ratio according to the engine operating state.

12. A spark ignition type internal combustion engine as set forth in claim 9 wherein when the operating condition of the engine shifts from a low load operation where the mechanical compression ratio is made maximum to a medium and high speed medium and high load operation, the controller is programmed to delay the speed of change of the mechanical compression ratio when the operation for changing the opening timing of the intake valve is started.

13. A spark ignition type internal combustion engine as set forth in claim 1, wherein the controller is programmed to shift the closing timing of the intake valve as the engine load becomes lower in a direction away from intake bottom dead center until a limit closing timing enabling control of the amount of intake air fed into the combustion chamber.

14. A spark ignition type internal combustion engine as set forth in claim 13, wherein in a region of a load higher than the engine load when the closing timing of the intake valve reaches said limit closing timing, the controller is programmed to control the amount of intake air fed into the combustion chamber by changing the closing timing of the intake valve without depending on a throttle valve provided in an engine suction passage.

15. A spark ignition type internal combustion engine as set forth in claim 14, wherein in a region of a load higher than the engine load when the closing timing of the intake valve reaches said limit closing timing, the controller is programmed to hold the throttle valve in the fully opened state.

16. A spark ignition type internal combustion engine as set forth in claim 13, wherein in a region of a load lower than the engine load when the closing timing of the intake valve reaches said limit closing timing, the controller is programmed to control the amount of intake air fed into the combustion chamber by a throttle valve provided in an engine suction passage.

17. A spark ignition type internal combustion engine as set forth in claim 13, wherein in a region of a load lower than the engine load when the closing timing of the intake valve reaches said limit closing timing, the lower the load, the controller is programmed to make the air-fuel ratio larger.

18. A spark ignition type internal combustion engine as set forth in claim 13, wherein in a region of a load lower than the engine load when the closing timing of the intake valve reaches said limit closing timing, the controller is programmed to hold the closing timing of the intake valve at said limit closing timing.

19. A spark ignition type internal combustion engine as set forth in claim 1, wherein the controller is programmed to increase said mechanical compression ratio as the engine load becomes lower until the limit mechanical compression ratio.

20. A spark ignition type internal combustion engine as set forth in claim 19, wherein in a region of a load lower than the engine load when said mechanical compression ratio reaches said limit mechanical compression ratio, the controller is programmed to hold the mechanical compression ratio at said limit mechanical compression ratio.

* * * * *